United States Patent [19]

Kalmanash

[11] Patent Number: 5,532,852

[45] Date of Patent: Jul. 2, 1996

[54] HIGH SPEED, HIGH AMBIENT VIEWABILITY LIQUID CRYSTAL DISPLAY ASSEMBLY

[75] Inventor: Michael H. Kalmanash, Los Altos, Calif.

[73] Assignee: Kaiser Aerospace and Electronics Corporation, Foster City, Calif.

[21] Appl. No.: 200,148

[22] Filed: Feb. 23, 1994

[51] Int. Cl.$^6$ .................................................. G02F 1/1335
[52] U.S. Cl. ........................... 359/73; 359/65; 359/63
[58] Field of Search ........................ 359/102, 73, 63, 359/53, 65

[56] References Cited

U.S. PATENT DOCUMENTS

| | | | |
|---|---|---|---|
| 4,492,432 | 1/1985 | Kaufmann et al. | 359/73 |
| 4,657,348 | 4/1987 | Ziegler | 359/73 |
| 4,701,028 | 10/1987 | Clerc et al. | 359/73 |
| 4,770,500 | 9/1988 | Kalmanash | 359/73 |
| 4,813,770 | 3/1989 | Clerc et al. | 359/65 |
| 4,889,412 | 12/1989 | Clerc et al. | 359/65 |
| 5,107,356 | 4/1992 | Castleberry | 359/93 |
| 5,325,218 | 6/1994 | Willet et al. | 359/65 |

FOREIGN PATENT DOCUMENTS

| 3188420 | 8/1991 | Japan | 359/65 |
|---|---|---|---|

*Primary Examiner*—William L. Sikes
*Assistant Examiner*—Kenneth Parker
*Attorney, Agent, or Firm*—Marvin H. Kleinberg; Marshall A. Lerner; Michael J. Ram

[57] ABSTRACT

A liquid crystal display assembly includes an untwisted nematic liquid crystal cell structure. The light transmittance of each pixel element of the assembly is a function of the pixel drive voltage. A phase compensating plate reduces the voltage necessary to permit switching, permitting compatibility with conventional thin film transistor (TFT) arrays but capable of greatly shortened response times. The configuration includes a combination linear polarizer and quarter wave plate which functions as a circular polarizer for blocking reflections from internal specularly reflecting surfaces within the liquid crystal display, thereby enhancing high ambient viewability.

16 Claims, 1 Drawing Sheet

HIGH SPEED, HIGH AMBIENT VIEWABILITY LIQUID CRYSTAL DISPLAY ASSEMBLY

FIELD OF INVENTION

The present invention relates to an improved liquid crystal display assembly, and more particularly to a display whose individual picture elements (pixels) may be switched from a freely light transmissive state to a non-transmissive state with a relatively low level signal and at a relatively high rate of speed.

BACKGROUND OF THE INVENTION

Active matrix liquid crystal display ("AMLCD") devices offer a full color, sunlight readable alternative to cathode ray tubes for many display applications, with significant reductions in weight, power and volume.

AMLCDs typically consist of a cell of twisted nematic ("TN") liquid crystals viewed between polarizers, and an integral backlight which generates the display luminance. The TN liquid crystal cell ("LCC") rotates the polarization of incident light as a function of applied voltage. If the polarizers are oriented in parallel, the non-rotated light is transmitted (clear state) while light which is rotated by 90° within the LCC is absorbed by the output polarizer (dark state). This situation is reversed if the polarizers are oriented orthogonally to each other.

Individually controlled transparent, conductive "pixel electrodes", arranged in a matrix on one of the LCC substrates, form an array of individual optical shutters (pixel elements) which collectively generate the image. The light transmission of each individual pixel element is a function of the voltage which is applied across that pixel section of the LCC by the corresponding pixel electrodes. Each of these voltages is controlled by a thin film transistor ("TFT"), which is part of an array located on the same LCC substrate as the pixel electrodes. The use of TFTs within the LCC improves contrast, widens the viewing angle and minimizes cross-talk between pixel elements.

State of the art AMLCD multifunction displays have demonstrated high quality graphics presentations. However, the relatively slow TN LCC optical response times, particularly for changes in gray scale (less than full scale), cause noticeable smearing of dynamic video images.

LCC response times are temperature dependent and tend to increase as temperature decreases. Heaters can be employed to minimize these effects. Improvements to the baseline LCC response characteristics, however, are essential to make the AMLCD technology a viable display candidate for a broad range of applications.

These lengthy LCC response times reflect the viscous fluid flow characteristics of the twisted nematic (TN) molecular structure. In the bi-level mode of operation, the optical response time of TN LCCs is on the order of 20 to 30 milliseconds (msec). Response times for gray scale operation, however, can vary to as much as 100 msec or more.

In cases where the response time exceeds the period between data updates, the contrast is degraded unless the desired transmissiveness of each pixel element remains unchanged through enough data updates for the desired gray level to be obtained. This is not possible in many dynamic situations. An order of magnitude LCC response time improvement would alleviate this problem and vastly improve the applicability of AMLCDs to demanding video requirements.

The response time of a TN device also varies inversely as the square of the cell thickness. Therefore, a reduction in cell thickness from the value of 5–7 microns typically used in a commercial products could have a considerable effect on performance. Achieving the needed order of magnitude response time improvement, however, necessitates reducing the cell thickness by almost 70%. It is not yet possible to manufacture high quality liquid crystal cells that thin.

Even ignoring the manufacturing issues, the attainable LCD contrast is a function of cell thickness, see Gooch & Tarry: "Optical Characteristics of Twisted Nematic Liquid-Crystal Films", Electronics Letters, 10 Jan. 1974. With the currently available liquid crystal materials it would be impossible to achieve the requisite amount of contrast with such a thin device.

What is therefore needed is a new LC structure, different from TN, with improved fluid flow characteristics to achieve the desired reductions in display device response time while preserving high contrast and wide angle of view.

Liquid crystal devices based on an "untwisted nematic" ("UTN") liquid crystal structure have achieved turn off times of approximately 2 msec, and turn on times of less than 200 µsec. Like TN devices, these UTN cells control the polarization of incident light and are typically viewed between front and rear polarizers, forming an array of light shutters whose transmission for each pixel element is dependent on the voltage applied across that pixel section of the LCC by the transparent, conductive pixel electrode. Also similar to TN devices, the UTN devices have what is called a "director" axis. This is the axis along which the molecules of the liquid crystal align lengthwise. An orthogonal axis may be defined as projecting orthogonally from the director axis in the plane of the polarizer.

For a TN device, the director axis rotates through 90° in transitioning from one of the cell substrates to the other. Impinging light should be polarized along the director axis as it is oriented near the first LCC substrate in order for it to be received and to then have its polarization vector rotated by the twisted liquid crystal molecules. In the untwisted configuration, the director axis is fixed. For this configuration, the impinging light is polarized at an angle of 45° with respect to the LCC director axis, so that it can be described as having two equal components, one orthogonal to the director axis (orthogonal component) and the other along the director axis (parallel component).

The component of the impinging light that is polarized along the director axis is phase shifted while light which is polarized orthogonally to the axis is not. The amount of phase shift is a function of the material birefringence, the cell thickness and the applied voltage.

By phase shifting the parallel component, the liquid crystal rotates the polarization vector of the light wave. If a half wave phase shift is introduced into the parallel component, for example, this component is reversed in sign as, $$\sin(180° + \phi) = -\sin(\phi)$$

In this case, the net polarity vector of the light is reflected about the LCC director axis. As the polarity after passing through the first polarizer is 45° with respect to the liquid crystal director axis, the reflection shifts the polarity by 90°, (i.e., to be −45° with respect to the director axis).

For phase shifts of other than a multiple of a half wave, the light exiting the LC cell has various degrees of elliptical polarization. Viewed between polarizers, this elliptical polarization would appear as intermediate levels of transmission ("gray shades").

For an untwisted LCC to provide maximum display contrast, the net phase shift of the device in the unpowered state must be at least a half-wave. Applying an increasing drive voltage to the LCC would reduce the net phase shift from its maximum value (unpowered state) toward zero phase shift (which would occur at a drive level corresponding to the device "saturation voltage"). Varying the phase shift from zero to a half wave maximizes the display contrast as the device transmission (viewed between polarizers) is varied from a maximum to minimum (or vice versa).

The output polarizer (analyzer) may be set parallel to the input polarizer or orthogonal to it. The orthogonal arrangement yields a result opposite from that produced by the parallel arrangement for the same LCC state. The LCC state which would produce maximum transmittance for an assembly with the polarizers parallel to each other, produces a zero transmittance state if the polarizers are set orthogonally. If the front and rear polarizers are parallel to each other, the net device transmission is given by the formula:

$$T=T_o \cos^2(\phi/2)$$

Note that the variability of transmission as a function of phase shift permits gray scale displays with this arrangement.

While the "untwisted" device architecture offers order-of-magnitude improvements in response time compared with TN devices, the voltage required for near-zero phase shift is much higher (up to 20 volts root-mean-square (rms) compared to about three volts rms for TN devices). This voltage is beyond the capability of standard amorphous silicon thin film transistors (TFTs).

Drive problems can be alleviated by designing the untwisted cell such that the phase shift in the unpowered state is greater than one half wave. This can be done by using liquid crystal materials with higher birefringence, or by increasing the LCC thickness from that which would produce a half wave phase shift in the unpowered state. Since the saturation voltage (corresponding to near-zero phase shift) remains essentially unchanged under these conditions, changing the cell design to increase the unpowered phase shift means that the drive voltage required to change the phase shift by a half wave with respect to the phase shift corresponding to the unpowered state is reduced. With proper display system design (described below), a half-wave change in LCC phase shift with respect to the unpowered value can provide display contrast equivalent to that achieved from varying between absolute phase shifts of zero and a half wave.

A different problem for twisted as well as untwisted devices is created by light falling on the front face of the display and which enters the assembly though the polarizer. Some of this light is reflected by the LCC. With the assembly heretofore described, such light would result in the non-transmissive state not being as dark as would otherwise be possible. This lowers display contrast, particularly in high ambient light conditions.

The prior art has not solved the problems addressed herein. The patent granted to Kashnow, U.S. Pat. No. 3,912,369 entitled "Single Polarizer Reflective Liquid Crystal Display" describes a device dependent on light entering from the face of the device and reflecting from a mirror in the rear of the device. The display uses liquid crystals with a twisted molecular structure and, accordingly, does not confront or resolve the problems posed by the slow switching rates of TN liquid crystals.

In the patent granted to Adams et al., U.S. Pat. No. 3,915,553, a color filter system is taught which is not optimized to change states rapidly in response to an electrical input. U.S. Pat. No. 4,093,356, granted to Bigelow, teaches a liquid crystal display which uses twisted nematic liquid crystal devices, change of state time of which is limited by the relatively slow times exhibited by twisted nematic liquid crystal devices generally.

The patent granted to Shanker et al., U.S. Pat. No. 4,991,924, discloses an optical switch that uses a type of liquid crystal cell which resolves incoming light into two orthogonal circularly polarized components. Because the device size is generally quite small, the teaching has been limited to fiber optic technology.

U.S. Pat. No. 4,919,522, granted to Nelson, discloses an optical switch that works with a type of liquid crystal cell that has birefringence along two different sets of axes, that is it phase shifts one light wave with respect to the other. The light is directed along a chosen path by splitting the light into two paths, one of which is blocked by a polarizer. Nelson does not address the issue of achieving variable levels of transmission, nor does he consider the problem of achieving a clean switching result with a relatively low voltage source.

The patent granted to Kalmanash, et al., U.S. Pat. No. 4,770,500 (assigned to the assignee of the present invention) discloses a device designed to switch states so that one color or another is emitted. It does not address the display of gray scales by the LCD. Although there is a signal level which causes the colors to be mixed, resulting in a third color, there is no independent intensity control associated with the LCD.

U.S. Pat. No. 5,005,952, granted to Clark et al., teaches a polarization controller. By arranging a number of liquid crystal variable polarity shifters, the user is able to shift the polarity of light as it passes through the device. This device, however, is not designed to control the amount of light passing through but rather, is designed to control the polarization of the light it emits.

SUMMARY OF THE INVENTION

Untwisted nematic liquid crystal cells ("UTN LCCs") introduce a relative phase shift into passing light that is inversely related to the applied driving voltage, with the maximum phase shift occurring in the unpowered state. A root-mean-square (rms) drive voltage of approximately 20 volts is required to drive an UTN LCC into a state where it shifts the phase of the parallel component light by only a negligible amount, to produce a state of maximum light transmittance for an assembly as described above.

The LCC may be designed such that the phase shift in the unpowered state is greater than a half wave. This can be accomplished by substituting liquid crystal materials with increased birefringence, or by increasing the LCC cell gap (thickness of the liquid crystal layer), and has little effect on the saturation voltage (the drive level corresponding to a near-zero phase shift). Under these conditions, application of the full drive voltage (nominally 20 volts rms) would cause a net change in phase shift of greater than a half wave (between the unpowered state and the saturation level), and therefore a reduced drive voltage could be used to provide a change in phase shift of a half wave.

Under these conditions, inserting a fixed phase shifting wave plate adjacent to the LCC could reduce the net unpowered state phase shift to exactly a half wave (LCC phase shift+fixed wave plate phase shift). A drive voltage of less than the full saturation voltage would reduce the phase shift induced in the LCC by exactly a half wave, which would correspond to a net phase shift of zero. If the combination (LCC+fixed wave plate) were then viewed between polarizers, full display contrast would be realized, with a reduced drive voltage (nominally 10 volts rms).

Note that the contrast would actually be better than that using the LCC alone, even with full saturation drive voltage applied. This is because the small residual LCC phase shift corresponding to application of the saturation voltage limits the display contrast. By adding a fixed wave plate as described above, the overall phase shift can be varied precisely between zero and a half wave.

In general the transmission is now described by the equation:

$$T=T_o \cos^2[(\phi-\phi_o)/2]$$

where $T_o$ is the maximum transmittance, $\phi$ is the phase shift induced by the LCC $\phi_o$ is the phase shift induced by the wave plate.

The use of wave plates within the liquid crystal display architecture suggests another variant that addresses the problem of light entering through the front face of the assembly and reflecting from the LCC causing reduced contrast when high ambient light is present. A significant portion of this reflected light is comprised of specular reflections from the LCC surfaces. The solution to this problem involves the use of two wave plates, one on either side of the LCC. These wave plates are fabricated and installed such that they cause a net phase shift of $\phi_o$, as before, but the front (i.e. closer to the observer) wave plate phase shifts the parallel component of the light by a quarter wave (90°).

As a result, the parallel component of light that passes through the front wave plate, reflects from the LCC and passes back through the front wave plate is shifted by a total of one half wavelength. As noted earlier, this rotates the polarization vector of the light (the total of both components) by 90°, causing it to be orthogonal to the front polarizer and therefore incapable of passing through it. The second wave plate (on the other side of the LCC), provides a phase shift of $\phi_o-90°$, so that the two wave plates plus LCC permit operation with a net phase shift varying between zero and 180°.

Since high ambient AMLCD contrast is limited largely by specular reflectivity, this technique is expected to significantly improve high ambient AMLCD viewability.

The novel features which are characteristic of the invention, both as to structure and method of operation thereof, together with further objects and advantages thereof, will be understood from the following description, considered in connection with the accompanying drawings, in which the preferred embodiment of the invention is illustrated by way of example. It is to be expressly understood, however, that the drawings are for the purpose of illustration and description only, and they are not intended as a definition of the limits of the invention.

DETAILED DESCRIPTION OF THE DRAWINGS

Figure 1:
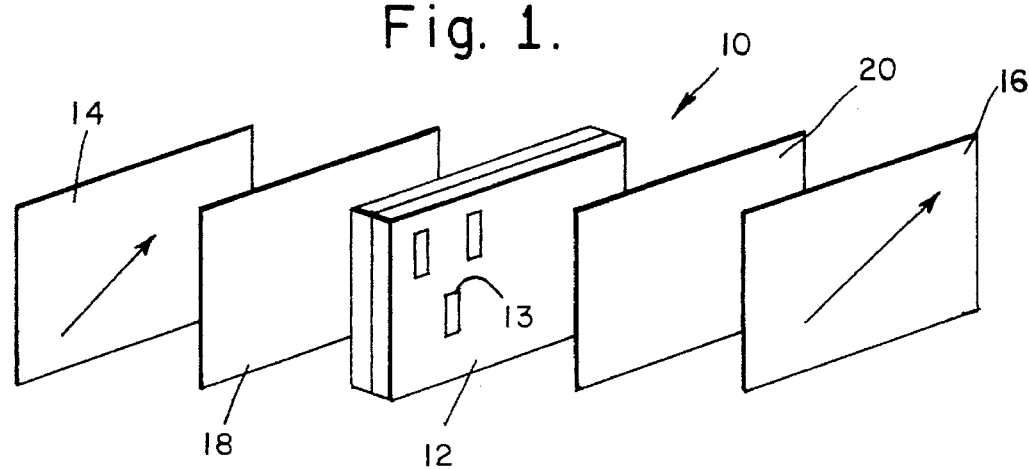
FIG. 1 is an expanded perspective view of an assembly according to the present invention.

FIG. 1 shows a liquid crystal display assembly 10 which is based on a voltage controlled liquid crystal cell (LCC) 12. On the surface of the LCC 12, representative pixel sections 13 are shown. This assembly 10 is designed to be oriented with light entering from the back (or the left in FIG. 1). The assembly is viewed, however, from the front (or the right in FIG. 1). It is well known in the prior art that each pixel section 13 of the LCC 12 is separately controlled by the voltage differential placed across it by a pair of individually controlled substantially transparent and conductive pixel electrodes (not shown).

The liquid crystal cell 12 (LCC) used in the assembly 10 is generally constructed with untwisted nematic (UTN) liquid crystals, although any liquid crystal cell that has a similar effect on light passing through it fits within the scope of the present invention. The molecules of the liquid crystal cells of this type line up lengthwise along what is called the "director axis." Light that passes through the cell polarized parallel to the director axis is phase shifted relative to the light that is polarized orthogonally to the director axis by an amount that is inversely related to the voltage applied to the LCC 12 at each pixel section 13.

Another general characteristic of "untwisted" liquid crystal cells is that a pixel section potential difference on the order of 20 volts rms ("saturation voltage") is required to drive pixel element to the state where it has no effect on the light passing through it. One purpose of this invention is to devise an assembly, using such a cell, which provides a clear, maximally light transmitting pixel element with a drive voltage on the order of 10 volts rms or less.

A first polarizer 14 is located behind the liquid crystal cell and is arranged such that the light passing through it is polarized at a 45° angle relative to the director axis of the liquid crystal cell 12. Light passing through the first polarizer 14 may be thought of as comprising a first or parallel component, polarized parallel to the LCC director axis, and a second or orthogonal component, polarized orthogonally to the director axis.

When the light from the first polarizer 14 passes through a pixel section 13 of the LCC 12, the phase shift introduced to the parallel component of the light rotates the polarization vector of the light. While a phase shift $\phi$, where $\phi$ is not equal to a multiple of 180°, produces elliptical polarization, a phase shift $\phi=n.180°$, where $n=1, 3, \ldots$, changes the sign of the parallel component as, $$\sin(\theta+n.180°)=-\sin(\theta)$$

This change of sign causes the polarization vector to be reflected about the orthogonal axis. Inasmuch as the polarization vector is at a 45° angle to the orthogonal axis after the light passes through the first polarizer 14, the polarization vector of the light is rotated by 90°.

A second polarizer 16 is located in front of the LCC 12. This second polarizer 16 is typically arranged so that it is parallel to the first polarizer 14. Accordingly, it will not pass light that has been shifted by 90° between the polarizers inasmuch as that light would then be orthogonal to the direction of polarization. Light for which the parallel component has been phase shifted between 0° and 180° will have an elliptical polarization and will be partially transmitted through the second polarizer 16 to a degree related to the amount of phase shift introduced by the LCC pixel section 13, permitting the display of a series of intermediate or gray shades.

Alternatively, the second polarizer 16 could be arranged so that its direction of polarization is orthogonal to that of the first polarizer 14. In such an embodiment, the polarization of the light would have to be rotated by 90° between the two polarizers in order for light to be transmitted. If the polarization vector was not rotated at all, no light would be transmitted through the second polarizer 16.

A pair of wave plates 18, 20 are located immediately behind and in front of the LCC 12, respectively. The first wave plate 18 phase shifts the parallel component by $-\phi_{o-}$ 90°. The second wave plate 20 phase shifts the parallel component by 90°. The total shift of both wave plates is then $-\phi_{o}$.

The liquid crystal cell is designed such that the parallel component of its phase shift in the unpowered state is $(\phi_{o}+180°)$. Thus the net phase shift through the optical path when the LCC is "off" (unpowered) is 180° (LCC+wave plates).

Application of the LCC saturation voltage (nominally 20 volts rms) would reduce the LCC phase shift from $(\phi_{o}+180°)$ to $\phi_{o}$. This would produce a net phase shift of zero when the LCC is "on" (10 volts rms applied). This allows each pixel to reach its maximally transmissive state when enough voltage is applied to cause the LCC pixel section 13 to shift the phase of the parallel component by $\phi_{o}$.

The reason for having two wave plates to achieve a phase shift which could easily be accomplished by a single wave plate is to attack the problem of ambient light which enters the front of the assembly 10 through the second polarizer, reflecting off the LCC pixel section 13 and is transmitted through the second polarizer 16 and out the front of the assembly 10. In an array of pixels, this sort of reflection "washes out" the appearance of those pixel elements which are set to a non-transmissive state, thereby lessening the contrast of these pixel elements compared to the ones that are set to a transmissive state.

The second wave plate 20 solves this problem because the reflected light passes through this wave plate twice (once on the way in and once on the way out). As the parallel component is phase shifted by 90° each time, the total phase shift will be 180°. As discussed previously, this will rotate the polarization vector of the wave front by 90°, causing it to be orthogonal to the second polarizer 16, which will therefore block this light from exiting through the front of the assembly 10. The contrast of the array in high ambient light conditions should thereby be substantially improved.

In summary, the inclusion of the two wave plates with a combined phase shift of $-\phi_{o}$ lessens the voltage which must be applied to the assembly to achieve a clear state. This is because it makes it possible for the assembly to achieve a "clear" state when the LCC is causing a shift of $\phi_{o}$ between the phases of the parallel and orthogonal components. It can take a markedly lower voltage to drive the LCC to a state where it causes a relative phase shift of $\phi_{o}$ than it does to drive the LCC to a state where it leaves the relative phase essentially unshifted.

In addition, the second wave plate, which provides a quarter wave phase shift in polarity, prevents light from entering the front of the display, reflecting from the LCC and exiting the display through the front polarizer. Light that took this path would have its polarization vector rotated by a total of 90° and would therefore be blocked from exiting through the first polarizer.

Figure 2:
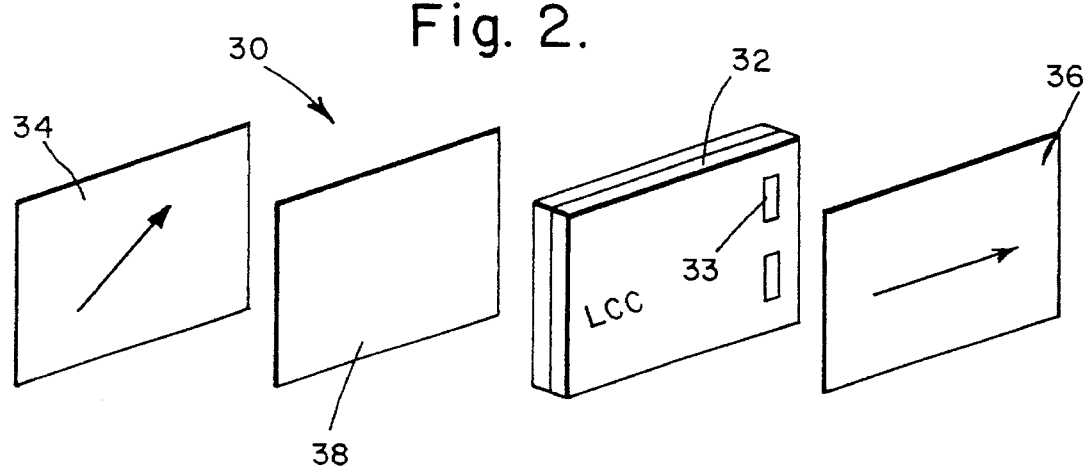
FIG. 2 is an expanded perspective view of an alternative embodiment of an assembly according to the present invention.

FIG. 2 is a diagrammatic view of a second embodiment of the present invention. This embodiment differs from that described by FIG. 1 in that the two wave plates 18, 20, in FIG. 1 are replaced by a single wave plate 38 in the assembly 30. Because of this modification, this embodiment is more vulnerable to light which enters the assembly through the front polarizer and reflects from the LCC.

This assembly 30 is designed to be oriented with light entering the package from the rear (or the left in FIG. 2). The assembly 30 is viewed, however, from the front (or the right in FIG. 2).

The liquid crystal cell 32 (LCC) has the same characteristics as the liquid crystal cell 12 of FIG. 1. A first polarizer 34 is located behind the LCC 32 and is arranged such that the light passing through it is polarized at a 45° angle relative to the director axis of the LCC 32. This enables the representation of light passing through the first polarizer 34 as being comprised of two equal components: a first or parallel component, polarized parallel to the LCC director axis, and a second or orthogonal component, polarized orthogonally to the director axis.

When the light from the first polarizer 34 passes through an LCC pixel section 33, the phase shift introduced to the parallel component of the light rotates the polarization vector of the light. While a phase shift $\phi$, where:

$$180° > \phi > 0$$

produces elliptical polarization, a phase shift $\phi = 180°$ changes the sign of the parallel component as, $$\sin(\theta + 180°) = -\sin(\theta)$$

This change of sign causes the polarization vector to be reflected about the orthogonal axis. Inasmuch as the polarization vector is at a 45° angle to the orthogonal axis after the light passes through the first polarizer 34, the polarization vector of the light is rotated by 90°.

A second polarizer 36 is located in front of the LCC 32 This second polarizer 36 is typically arranged so that it is parallel to the first polarizer 34. Accordingly, it will not pass light that has been rotated by 90° between the polarizers inasmuch as that light would then be orthogonal to the direction of polarization. Light for which the parallel component has been phase shifted between 0° and 180° will have an elliptical polarization and will be partially transmitted through the second polarizer 36 to a degree related to the amount of phase shift introduced by the LCC 32, permitting the display of a series of intermediate or gray shades.

Alternatively, the second polarizer 36 could be arranged so that its direction of polarization is orthogonal to that of the first polarizer 34. In such an embodiment, the polarization of the light would have to be rotated by 90° between the two polarizers in order for light to be freely transmitted. If the polarization vector was not rotated at all, no light would be transmitted through the second polarizer 36.

A wave plate 38, introducing a phase shift of $\phi_{o}$ between the director component and the orthogonal component, is located immediately behind the LCC 32. The phase shift, $-\phi_{o}$, may be chosen to negate the phase shift introduced by an LCC pixel section when it is driven by a voltage of approximately 10 volts rms. With this choice, the assembly 30 achieves a "clear" state when only 10 volts rms are applied as opposed to the 20 volts rms which are normally necessary to drive an LCC to a "clear" state.

In summary, the inclusion of the wave plate 38 with a phase shift of $-\phi_{o}$ makes it possible for the assembly to achieve a clear state when a voltage of only 10 volts rms is applied to it. This is because the wave plate negates the phase shift which the LCC introduces at this drive voltage. It takes a markedly lower voltage to drive the LCC to a state where it causes a relative phase shift of $\phi_{o}$ than it does to drive the LCC to a state where it leaves the relative phase substantially unshifted.

Figure 3:
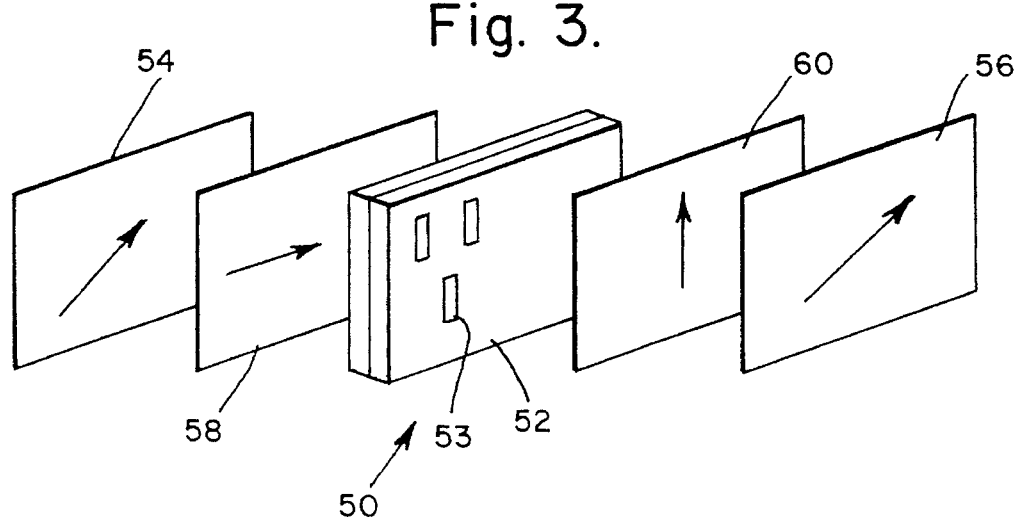
FIG. 3 is an expanded perspective view of another alternative embodiment of an assembly according to the present invention.

A diagrammatic view of a third embodiment 50 is shown in FIG. 3. This embodiment does not allow a full scale clear state with only a 10 volt rms input, but it does block from reflection, light that enters the front face of the device and reflects from the LCC.

This assembly 50 is designed to be oriented with light entering the package from the rear (or the left in FIG. 3). As with the other embodiments, the assembly is viewed from the front (or the right in FIG. 3).

The LCC 52 has the same characteristics as the LCC 12 of FIG. 1. A first polarizer 54 is located behind the LCC 52 and is arranged such that the light passing through it is polarized at a 45° angle relative to the director axis of the LCC 52. This enables a representation of the light passing through the first polarizer 54 as being comprised of two equal components: a first or parallel component, polarized parallel to the LCC director axis, and a second or orthogonal component, polarized orthogonally to the director axis.

When the light from the first polarizer 54 passes through an LCC pixel section 53, the phase shift introduced to the parallel component of the light rotates the polarization vector of the light. While a phase shift φ where:

$$180° > \phi > 0$$

produces elliptical polarization, a phase shift φ=180° changes the sign of the parallel component as, $$\sin(\theta + 180°) = -\sin(\theta).$$

This change of sign causes the polarization vector to be reflected about the orthogonal axis. Inasmuch as the polarization vector is at a 45° angle to the orthogonal axis after the light passes through the first polarizer 14, the polarization vector of the light is rotated by 90°.

A second polarizer 56 is located in front of the LCC 52 This second polarizer 56 is typically arranged so that it is parallel to the first polarizer 54. Accordingly, it will not pass light that has been rotated by 90° between the polarizers inasmuch as that light would then be orthogonal to the direction of polarization. Light for which the parallel component has been phase shifted between 0° and 180° will have an elliptical polarization and will be partially transmitted through the second polarizer 56 to a degree related to the amount of phase shift introduced by the LCC pixel section 53, permitting the display of a series of intermediate or gray shades.

Alternatively, the second polarizer 56 could be arranged so that its direction of polarization is orthogonal to that of the first polarizer 54. In such an embodiment, the polarization of the light would have to be rotated by 90° between the two polarizers in order for light to be transmitted. If the polarization vector was not rotated at all, no light would be transmitted through the second polarizer 56.

A first phase shifting wave plate 58, which introduces a phase shift of λ/4 (quarter wave) between the director component and the orthogonal component (relative phase shift), is located immediately behind the LCC 52. A second phase shifting wave plate 60 introduces a relative phase shift of −λ/4 and is located directly in front of the LCC 52.

As the effects of the two wave plates 58, 60 negate each other, they, together, have no effect on the light passing through the assembly. The second wave plate 60, however, introduces a total relative phase shift of λ/2 (half wave) into light that enters through the front face of the assembly and is reflected from the LCC 52. This relative phase rotation translates into a 90° rotation of the polarization vector which renders the light orthogonal to the axis of polarization of the second polarizer 56, thereby preventing this light from being emitted through the front face of the assembly 50.

Thus, there has been shown a novel liquid crystal display utilizing untwisted nematic liquid crystals that can be controlled to pass or block light with voltages as low as 10 volts rms. First and second polarizers on either side of an LCC, together with a phase shifting wave plate provide adequate control of transmitted light so that individual pixels can alternatively transmit or block light. At low voltages, the transmitted light will appear as shades of grey depending upon the voltage.

The polarizers can either be arranged to be parallel or orthogonal to each other. When parallel, light will be transmitted to a degree determined by the voltage applied to the LCC. If the polarizers were orthogonal to each other, transmission would require a phase shift of one quarter wave.

By providing a phase shifting plate intermediate the polarizers, the amount by which the LCC need shift the phase for fully clear or fully dark display is reduced, thereby reducing the magnitude of the voltage needed to achieve the result. With this addition, voltage levels compatible with TFT's can be used, rather that the greater voltages normally required.

What is claimed as new is:

1. In an improved transmissive liquid crystal display having a matrix of individually controlled liquid crystal cell pixel elements each adapted to be coupled to a variable voltage source for controllably transmitting a portion of the entering light, including a liquid crystal cell of untwisted nematic liquid crystal molecules imparting a relative phase shift φ to impinging light, comprising:

a first polarizer with its axis of polarization polarizing light transmitted to the display to an angle of approximately 45° relative to the director axis, interposed between a source of light and the display;

a second polarizer with its axis of polarization selectively oriented to be one of parallel and perpendicular relative to the axis of polarization of said first polarizer, placed between the display and an observer; and phase shifting means adjacent the liquid crystal display to impart to impinging light a relative phase shift of a predetermined amount −φ$_o$ to compensate for the minimum relative phase shift imparted to transmitted light by the liquid crystal cell itself; whereby varying the voltage applied to each pixel element of the display changes the relative phase shift imparted to impinging light thereby controlling the amount of light transmitted through that pixel element, with the minimum phase shift, φ$_o$, corresponding to the maximum available applied voltage.

2. An improved assembly as in claim 1, in which said phase shifting means include a wave plate.

3. An improved assembly, as in claim 1, wherein the axis of polarization of said second polarizer is oriented to be parallel to the axis of orientation of said first polarizer.

4. An improved assembly, as in claim 1, wherein said phase shifting means comprises two wave plates positioned on opposite side of the liquid crystal cell.

5. An improved assembly, as in claim 4, wherein each said wave plate is inserted into the optical path with its slow axis orthogonal to the director axis of the liquid crystal cell.

6. An improved assembly, as in claim 4, wherein the front most wave plate introduces a λ/4 phase shift.

7. A transmissive liquid crystal display assembly with improved anti-reflective qualities, adapted to be coupled with a variable voltage source, wherein light enters said assembly from a rear face and a controllable portion of the entering light is transmitted through a front face of the assembly, said assembly comprising:

a liquid crystal display employing untwisted nematic liquid crystal molecules and comprised of a matrix of separately controlled pixel sections, all having a common director axis, wherein for each said pixel section the light entering that is polarized parallel to said director axis is phase shifted relative to the light entering that is polarized orthogonally to said director axis, the relative phase shift being a function of the voltage applied to that pixel section with a minimum relative phase shift of $\phi_o$ corresponding to the maximum available applied voltage;

a first polarizer between a source of light and the rear face of said liquid crystal display and arranged to polarize impinging light to an angle of approximately ±45°, relative to said director axis;

a second polarizer placed in front of the front face of said liquid crystal display with its polarization axis alternatively parallel and perpendicular to the polarization axis of said first polarizer for polarizing light transmitted through said display;

phase cancelling means adjacent said display for providing a phase shift $-\phi_o$ that is of the same magnitude as the minimum phase shift $\phi_o$ resulting from the passage of light through said liquid crystal display pixel section when the maximum available voltage is applied to that pixel section;

a first phase shifter for introducing a relative phase shift of $\pm\lambda/4$, said first phase shifter being located adjacent the front face of said liquid crystal display; and a second phase shifter for introducing a relative phase shift of $-(\phi_o\pm\lambda/4)$, said second phase shifter being located adjacent the rear face of said liquid crystal display, whereby varying the voltage applied to each said pixel section controls the amount of light transmitted through the section and whereby the phase cancelling means permits the net phase shift of the assembly at pixel sections driven by the maximum available drive voltage to be zero and ambient light entering through the front face of the assembly and the second polarizer and reflecting from the liquid crystal display has its polarization rotated by each passage through the front most phase shifter so that further passage is blocked by said second polarizer.

8. An improved assembly as in claim 7, in which said first and second phase shifters are wave plates.

9. An improved assembly, as in claim 7, wherein the axis of polarization of said second polarizer is oriented parallel to the axis of polarization of said first polarizer.

10. An improved assembly, as in claim 7, wherein each of said first and second phase shifters is a wave plate.

11. An improved assembly, as in claim 10, wherein each said wave plate is inserted into the optical path with its slow axis normal to the director axis of said pixel sections.

12. A liquid crystal display assembly with improved anti-reflective qualities, adapted to be coupled with a variable voltage source, in which light enters said assembly from a rear face and a controllable portion of the entering light is transmitted through a front face of said assembly, said assembly comprising:

a liquid crystal cell of untwisted nematic liquid crystal molecules, including of a matrix of separately controlled pixel sections, all having a common director axis wherein for each pixel section, light entering polarized parallel to said director axis is phase shifted relative to light entering polarized orthogonally to said director axis, the relative phase shift being a function of the voltage applied to that pixel section;

a first polarizer adjacent the rear face of the display and arranged to polarize impinging light to an angle of approximately 45°, relative to said director axis;

a second polarizer located adjacent the front face of the display, oriented with its axis of polarization alternatively parallel and perpendicular to the axis of polarization of said first polarizer and arranged to polarize light transmitted through the display alternatively substantially parallel to and orthogonally to the polarization vector of light transmitted through said first polarizer;

a first phase shifter, set to cause a relative phase shift of $-(\lambda/4+\phi_o)$, located adjacent the rear face of the liquid crystal display; and a second phase shifter, set to introduce a relative phase shift of $\lambda/4$, located adjacent the front face of the liquid crystal display, wherein said first and second phase shifters collectively introduce a phase shift of $-\phi_o$, where $-\phi_o$ is chosen to compensate for the minimum phase shift created by the passage of light through said liquid crystal display, itself, whereby varying the voltage applied to each pixel element controls the amount of light transmitted through that element, with minimum phase shift $\phi_o$ corresponding to the maximum drive voltage available to be applied to that element, and whereby ambient light entering through the front face of the device and said second polarizer reflecting from said liquid crystal display has its polarization sense rotated to be blocked from further passage through said second polarizer.

13. An improved assembly as in claim 12, in which each said phase shifter is a wave plate.

14. An improved assembly, as in claim 12, wherein the axis of polarization of said second polarizer is oriented to polarize light parallel to said first polarizer.

15. An improved assembly, as in claim 12, wherein said phase shifting means are two wave plates positioned one on either side of said liquid crystal display.

16. An improved assembly, as in claim 15, wherein each said wave plate is inserted into the optical path with its slow axis normal to the director axis of the liquid crystal cell.

* * * * *